2,968,655
11-OXYGENATED-6-METHYL PROGESTERONE AND INTERMEDIATES THEREFOR

George B. Spero and John L. Thompson, both of Kalamazoo Township, Kalamazoo County, Mich., assignors to The Upjohn Company, Kalamazoo, Mich., a corporation of Michigan No Drawing. Filed Nov. 23, 1956, Ser. No. 623,821

8 Claims. (Cl. 260—239.55)

The present invention relates to steroid compounds and is concerned with 6-hydrocarbyl substituted 11α-hydroxy- and 11-ketoprogesterone and particularly with 6-methyl-11α-hydroxyprogesterone, the esters thereof, 6-methyl-11-ketoprogesterone, the intermediates therefor and a process of production thereof.

The new compounds and the process of the present invention are illustratively represented by the following formulae:

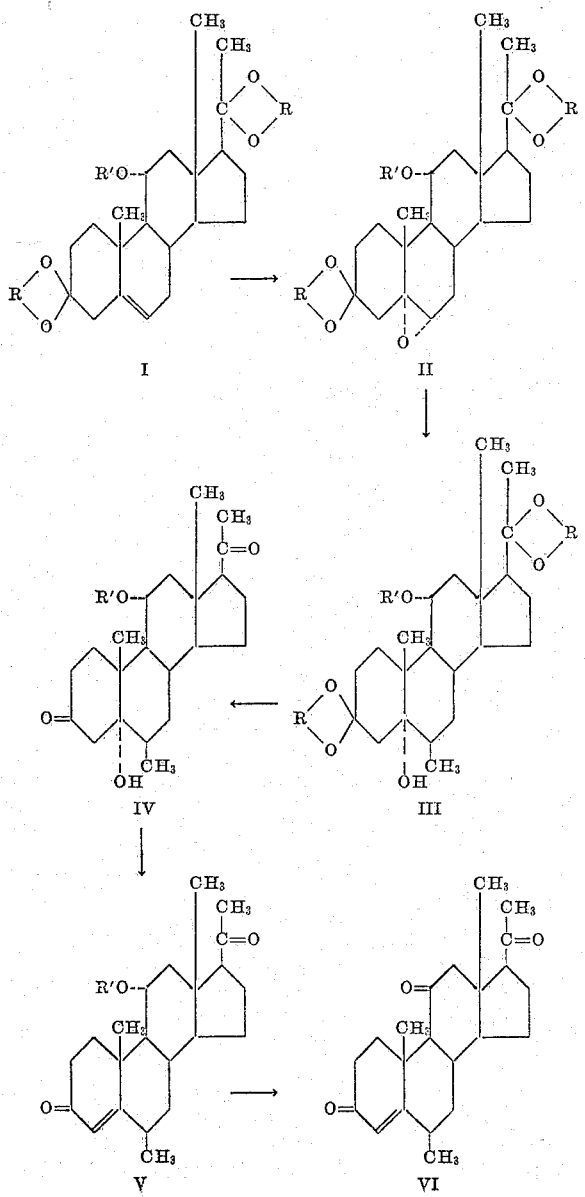

wherein R is an alkylene radical containing not more than eight carbon atoms, inclusive, and the attaching oxygen to carbon bonds are separated by a chain of at least two and not more than three carbon atoms, inclusive, and wherein R' is selected from the group consisting of hydrogen and acyl, the acyl group being the acyl radical of an organic carboxylic acid and preferably of a hydrocarbon carboxylic acid containing from one to nine carbon atoms, inclusive.

The process of the present invention comprises: treating a 11α-hydroxy or 11α-acyloxyprogesterone dialkylene ketal (I), with a peracid, such as performic, peracetic, and perbenzoic to obtain 5α,6α-oxido-11α-hydroxyallopregnane-3,20-dione 3,20-bis-(alkylene ketal) (II), or respectively the 11α-acylate thereof; treating the thus obtained 5α,6α - oxido-11α-hydroxyallopregnane-3,20-dione 3,20-bis-(alkylene ketal) or respectively the 11α-esters thereof (II) with a methyl metal compound, preferably a methyl metal halide and specifically a methyl Grignard reagent to give the corresponding 5α-hydroxy-6β-methyl-11α-hydroxyallopregnane - 3,20 - dione 3,20-bis-(alkylene ketal), (III); hydrolyzing with acid in a suitable solvent the thus obtained diketal (III) to yield 5α-hydroxy-6β-methyl - 11α - hydroxyallopregnane-3,20-dione (IV), and dehydrating the thus obtained 5α-hydroxy-6β-methyl-11α-hydroxyallopregnane-3,20-dione (IV) with a base or an acid to obtain 6-methyl - 11α - hydroxy-4-pregnene-3,20-dione (6-methyl-11α-hydroxyprogesterone) (V). Using in the second step of the reaction other alkyl metal halides, dialkyl cadmium compounds, alkyl- and phenyl cadmium halides, aryl and alkyl calcium halides such as phenyl calcium iodide and especially alkyl and phenyl Grignards such as ethyl, propyl, butyl, phenyl magnesium bromide or iodide results in corresponding 5α-hydroxy-6-alkyl- or 6-phenyl-11α-hydroxyallopregnane-3,20-dione 3,20-diketals which by the subsequent steps are converted to the corresponding 6-alkyl- or 6-phenyl-11α-hydroxy-4-pregnene-3,20-diones. Oxidizing illustratively with chromic acid 6-methyl - 11α - hydroxy-4-pregnene-3,20-dione yields 6-methyl - 4 - pregnene-3,11,20-trione (6-methyl-11-ketoprogesterone) of formula VI. Esterifying with acid anhydrides or acyl halides at low temperatures in otherwise conventional manner 5α,11α-dihydroxy-6β-methylallopregnane-3,20-dione 3,20-bis-(ethylene ketal) (III), 5α,11α-dihydroxy - 6β - methylallopregnane-3,20-dione (IV) or 11α-hydroxy-6-methyl-4-pregnene-3,20-dione (V) yields the corresponding 11α-esters of these compounds such as the 5α-hydroxy-6β-methyl-11α-acyloxyallopregnane-3,20-dione 3,20-bis-(ethylene ketal), 5α-hydroxy-6β-methyl-11α-acyloxyallopregnane - 3,20-dione and 6-methyl-11α-acyloxy-4-pregnene-3,20-dione. If in the second step a 5α-hydroxy-6β-alkyl or 6β-phenyl-11α-hydroxypregnane-3,20-dione 3,20-diketal is produced, as disclosed before, 11α-esters of the resulting 5α,11α-dihydroxy-6β-alkyl or 6β-phenylallopregnane-3,20-diones, the 3,20-diketals thereof, and of the 6-alkyl- or the 6-aryl-11α-hydroxyprogesterones can be prepared at room temperature or lower temperatures in otherwise conventional manner.

It is an object of the instant invention to provide the 6-methyl - 11α - hydroxyprogesterone, 6-methyl-11-ketoprogesterone, and intermediates for the production thereof such as 5α-hydroxy-6β-methyl-11α-hydroxyallopregnane-3,20-dione and the alkylene ketals thereof, having from one to eight carbon atoms in the alkylene chain. It is another object of the instant invention to provide a process for the production of 6-methyl-11α-hydroxyprogesterone, 6-methyl-11-ketoprogesterone, and the intermediate 5α-hydroxy - 6β - methyl-11α-hydroxyallopregnane-3,20-dione, and 3,20-diketals thereof. It is a particular object of the instant invention to produce 6α-methyl-11-ketoprogesterone. Other objects of this invention will be apparent to those skilled in the art to which this invention pertains.

The new products, 6-methyl-11α-hydroxyprogesterone and 6-methyl-11-ketoprogesterone, have utility as intermediates in the production of 6-methylhydrocortisone and 6-methylcortisone and esters thereof, especially the 6α-methylhydrocortisone and 6α-methylcortisone, which compounds have glucocorticoid and anti-inflammatory activity in excess of hydrocortisone and Δ[1]-hydrocortisone and are therefore employable in the treatment of arthritis (cf. copending applications S.N. 601,601, filed August 2, 1956 and S.N. 601,634, filed August 2, 1956). Production of 6-methylcortisone and 6-methylhydrocortisone from 6-methyl-11α-hydroxyprogesterone or, respectively, 6-methyl-11-ketoprogesterone is shown in Example 15. Other highly anti-inflammatory 6-methyl steroid products which in addition have little or no salt retention can be made from 6-methylprogesterone, such as for example: 6-methyl-11β-hydroxyprogesterone (Example 16), 6-methyl-11β,21-dihydroxyprogesterone and 21-esters thereof (Example 17), 6-methyl-21-hydroxy-11-ketoprogesterone and 2-esters thereof (Example 18), 6-methyl-11β-hydroxy-21-fluoro-4-pregnene-3,20-dione (Example 19), 6 - methyl-21-fluoro-4-pregnene-3,11,20-trione (Example 20), 1-dehydro-6-methyl-11β-hydroxyprogesterone (Example 21), 1-dehydro-6-methyl-11-ketoprogesterone (Example 22), 1-dehydro-6-methyl-11β,21-dihydroxyprogesterone and 21-esters thereof (Example 23), 1-dehydro-6-methyl-21-hydroxy-11-ketoprogesterone and 21 - esters thereof (Example 24), 6-methyl-11β-hydroxy-21-fluoro-1,4-pregnadiene-3,20-dione (Example 25), 6-methyl-21-fluoro-1,4-pregnadiene-3,11,20-trione (Example 26), 6-methyl-9α-fluoro-11β-hydroxyprogesterone (Example 27), 6-methyl-9α-fluoro-11-ketoprogesterone (Example 28), 1-dehydro - 6 - methyl-9α-fluoro-11β-hydroxyprogesterone (Example 29), 1-dehydro-6-methyl-9α-fluoro-11-ketoprogesterone (Example 30), and the like. These compounds as well as those analogues of the above steroids wherein instead of the 6-methyl group, other alkyl groups or aryl groups such as ethyl, propyl, isopropyl, butyl, isobutyl, pentyl, hexyl, phenyl, benzyl, or the like, are introduced in the parent steroid, are useful for treatment of arthritis in the form of tablets and injectables and are particularly useful for the treatment of topical inflammatory conditions of the skin, in the form of ointments or for the eyes, ears and nose in the form of drops, nasal sprays or ointments.

Both 6α-methyl- and 6β-methyl-11-ketoprogesterone show marked anti-inflammatory activity, while at the same time exhibiting a relatively low order of glucocorticoid activity. They are thus useful in the treatment of arthritic diseases of the joints in the form of tablets and injectables. They are also useful for the treatment of inflammatory conditions of the skin when administered in the form of topical ointments and lotions, and of the eyes, ears, and nose in the form of drops, nasal sprays, and ointments.

Both 6β-methyl- and particularly 6α-methyl-11-ketoprogesterone have pronounced diuretic activity and are useful in the alleviation of edematous conditions resulting from the excessive retention of salt and water. They also have central nervous system depressant activity manifested by sedative and hypnotic activity and in addition potentiate the sleep-producing activity of hexobarbital.

The starting compounds of the instant invention are 11α-hydroxyprogesterone 3,20-diketals and 11α-acyloxyprogesterone 3,20-diketals produced as shown in Preparations 1 and 2.

In carrying out the process of the present invention the selected 11α-hydroxy- or 11α-acyloxyprogesterone 3,20-bis-(alkylene ketal) is dissolved in an organic solvent such as chloroform, methylene chloride, ethylene dichloride, carbon tetrachloride, benzene, toluene, ethyl acetate, or the like, and treated with an organic peracid such as performic, peracetic, perpropionic, perbenzoic, perphthalic acid or other organic peracids. The reaction is generally carried out at low temperatures such as between minus ten and plus ten degrees centigrade, however, higher temperatures such as room temperature and up to forty degrees centigrade are operable. In the preferred embodiment of the instant invention temperatures between zero and five degrees, a chlorinated hydrocarbon such as chloroform or methylene dichloride and peracetic or perbenzoic acid are used. The peracid is used in a quantity usually from ten to twenty percent above the quantity theoretically required up to five times the quantity required by theory.

At the end of the reaction the excess acid is neutralized with a base, preferably with sodium or potassium carbonate or bicarbonate, washed with water and the thus obtained 5α,6α - oxidoallopregnane-3,20-dione 3,20-bis-(alkylene ketal) recovered from the organic layer by evaporation. Recrystallization from organic solvents such as methanol, ethanol, Skellysolve B hexanes, heptanes, benzene, toluene, or the like, provides pure 5α,6α-oxido-11α-hydroxy- or 11α-acyloxyallopregnane-3,20-dione 3,20-bis-(alkylene ketal).

The thus obtained 5α,6α-oxido-11α-hydroxy- or 11α-acyloxyallopregnane - 3,20 - dione 3,20 - bis-(alkylene ketal), dissolved in a suitable organic solvent, such as tetrahydrofuran, benzene, ethyl ether, propyl ether, or the like, with the higher boiling solvents such as tetrahydrofuran and benzene preferred, is reacted with a methyl metal compound especially a methyl metal halide such as methyl magnesium chloride, bromide, or iodide, methyl lithium, dimethyl cadmium, or the like. Other useful alkyl or aryl metals and alkyl or aryl metal halides include the ethyl, propyl, butyl, pentyl, hexyl, phenyl, benzyl magnesium chloride, sodium or potassium compounds, the phenyl calcium iodide, the alkyl cadmium halides and dialkyl cadmium compounds wherein the alkyl group has from one to six carbon atoms, and the like, with the methyl magnesium bromide and methyl magnesium iodide preferred. In the preferred embodiment of the instant invention the reaction is started at room temperature or below, temperatures between zero and thirty degrees centigrade being preferred. After the addition of the methyl magnesium halide or other methyl metal halides, the temperature is raised and the reaction mixture is heated to about reflux temperature for a period of from one ot 48 hours. In general, a large excess of the Grignard reagent (ten to 500 mole equivalents) is used. The temperature for the Grignard addition reaction is generally between 25 to 100 degrees centigrade, with the preferred range of from sixty degrees centigrade to the reflux temperature of the mixture.

After the reaction is terminated, the reaction mixture is decomposed using neutral, rather than acidic conditions. In the preferred embodiment of the invention, the reaction mixture is mixed with an aqueous saturated ammonium chloride solution, cooled with ice, and the resulting mixture is stirred for a period of several minutes to one hour. The aqueous and organic layers are then separated from each other. The organic phase is washed, dried and evaporated to give the crude 5α,11α-dihydroxy-6β-methylallopregnane - 3,20 - dione 3,20-bis-(alkylene ketal), which can be purified by conventional procedures, such as recrystallization and/or chromatography with organic solvents.

The thus obtained 5α,11α-dihydroxy-6β-methylallopregnane-3,20-dione 3,20-bis-(alkylene ketal) is thereupon hydrolyzed in an acidified water-miscible solvent. As solvent, oxygenated organic solvents such as ketones and alkanols, e.g., methanol, ethanol, tertiary butyl alcohol and acetone are preferred; however, propyl alcohol, isopropyl alcohol, or dioxane, formamide, or the like, may be used as solvent. To the solution of the steroid is then added an organic or inorganic acid, preferably a mineral acid such as sulfuric acid or hydrochloric acid; but organic acids such as formic, acetic, propionic, and toluenesulfonic, may be used. The thus obtained mixture is refluxed, and thereafter the acidity decreased either by diluting with water or by neutralizing with a base such as sodium carbonate, potassium carbonate, sodium hydroxide, other alkali solutions or a bicarbonate such as sodium or potassium bicarbonate, and is then concentrated to give 5α,11α-dihydroxy-6β-methylallopregnane-3,20-dione as a crude product. The crude product can be purified by recrystallization from organic solvents such as acetone, ethyl acetate, Skellysolve B hexanes, methanol, tertiary butyl alcohol, ether, or the like, or mixtures thereof to give pure 5α,11α-dihydroxy-6β-methylallopregnane-3,20-dione.

The thus obtained 5α,11α-dihydroxy-6β-methylallopregnane-3,20-dione is thereupon dehydrated. Dehydration can be effected in alkali solution or in acidic solution, during which an inert atmosphere can be used such as one of nitrogen. In the preferred embodiment of the present invention alkali dehydration is preferred. For this purpose the steroid is dissolved in methanol, ethanol, dioxane, or other suitable solvents, unreactive to the base employed, the thus obtained solution is purged of oxygen by bubbling nitrogen through it, and then reacted with an oxygen-free alkali metal base solution. Sodium or potassium hydroxide are the preferred bases; however, alkali metal alkoxides, e.g., sodium methoxide or ethoxide, or earth alkali hydroxides such as barium hydroxide, calcium hydroxide, or the like, are operative. The alkaline mixture is then allowed to stand in a nitrogen atmosphere for a period of from four to 48 hours at a temperature between fifteen and forty degrees centigrade to give 6-methyl-11α-hydroxy-4-pregnene-3,20-dione (6-methyl-11α-hydroxyprogesterone). To isolate this 6-methyl steroid, the mixture is acidified, illustratively with acetic acid and the mixture is thereupon concentrated and finally evaporated to dryness. The resulting residue is purified by chromatography or other suitable means to give pure 6-methyl-11α-hydroxyprogesterone.

Dehydration can also be carried out by reacting the 5α,11α-dihydroxy-6-methylallopregnane-3,20-dione with an acid, or an 11-ester of 5α,11α-dihydroxy-6-methylallopregnane-3,20-dione with thionyl chloride in pyridine solution to give the 6-methyl-11α-hydroxy-4-pregnene-3,20-dione or the ester thereof.

Instead of the previously described steps of (1) decomposing the metal (Grignard) steroid complex in a neutral solution, (2) hydrolyzing to remove the ketal groups and (3) dehydrating to establish a 4(5)-double bond, the metal steroid complex in the original solution may be decomposed, hydrolyzed and dehydrated in one step by the addition of acid, illustratively dilute aqueous sulfuric acid or aqueous alcoholic acid solution. Temperatures between fifteen to forty degrees and a reaction time between six hours to three days depending on the temperatures employed are useful in this one-step procedure to produce 6-methyl-11α-hydroxy-4-pregnene-3,20-diones from the corresponding metal complex of 6β-methyl-5α,11α-dihydroxyallopregnane-3,20-dione.

Oxidation of 6-methyl-11β-hydroxyprogesterone in conventional manner by chromic anhydride in acetic acid produces 6-methyl-11-ketoprogesterone. Instead of oxidation of 6-methyl-11α-hydroxyprogesterone, 5α,11α-dihydroxy-6β-methylallopregnane-3,20-dione can be oxidized by chromic acid to give 5α-hydroxy-6β-methylallopregnane-3,11,20-trione which can be dehydrated, as shown before, to give 6-methyl-11-ketoprogesterone.

The following preparations and examples are illustrative of the product and the process of the present invention and are not to be construed as limiting.

PREPARATION 1

*11α-hydroxyprogesterone 3,20-bis-(ethylene ketal)*

A solution was prepared containing ten grams of 11α-hydroxyprogesterone, 0.5 gram of para-toluenesulfonic acid in 200 milliliters of benzene and twenty milliliters of ethylene. This solution was refluxed for three and one half hours using a water trap to remove the water formed in the reaction. After this period of reflux, the solution was cooled and water was added. The aqueous layer was separated and washed with ether and the ether extracts added to the organic layer. The total organic layers were then successively washed with five percent sodium bicarbonate solution, saturated with sodium chloride solution, water and then dried over sodium sulfate. The solvents were removed by distillation and the thus obtained residue was recrystallized from methanol to give in two crops 7.31 grams of 11α-hydroxyprogesterone 3,20-bis-(ethylene diketal) which when recrystallized from acetone had a melting point of 215 to 220 degrees centigrade.

PREPARATION 2

*11α-acetoxyprogesterone 3,20-bis-(ethylene ketal)*

In the same manner as shown in Preparation 1, 55.2 grams of 11α-acetoxyprogesterone, dissolved in 1100 milliliters of benzene and 110 milliliters of ethylene glycol, was heated to reflux in the presence of 2.7 grams of para-toluenesulfonic acid for a period of eighteen hours to give 44.2 grams of 11α-acetoxyprogesterone 3,20-bis-(ethylene glycol) of melting point 182 to 185 degrees centigrade.

In the same manner as shown in Preparations 1 and 2, other progesterone 3,20-bis-(ketals) are prepared by reacting at reflux temperature solutions of 11α-hydroxyprogesterone or 11α-acyloxyprogesterone in benzene, toluene, hexane, heptane, or other solvents with 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

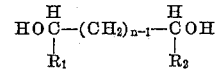

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluene-sulfonic acid, ortho-chlorobenzenesulfonic acid, sulfuric acid, and the like, to obtain the corresponding 11α-hydroxy or 11α-acyloxyprogesterone 3,20-bis-(alkylene ketal). Representative such 11α-hydroxy- and 11α-acyloxyprogesterone bis-ketals prepared include the 11α-hydroxyprogesterone 3,20-bis-(1,2-propylene ketal), 3,20-bis-(1,3-propylene ketal), 1,2- and 1,3-butylene diketal, 1,2-, 1,3- and 3,4-pentylene diketal, 11α-propionyloxyprogesterone 3,20-bis-(ethylene ketal), 11α-benzoyloxyprogesterone 3,20-bis-(ethylene ketal), and the like.

EXAMPLE 1

*5α,6α-oxido-11α-acetoxyallopregnane-3,20-dione 3,20-bis-(ethylene ketal)*

To a suspension of 8.8 grams of anhydrous sodium acetate in 88 milliliters of forty percent peracetic acid in an ice bath was added a solution of 44.2 grams of 11α-acetoxy-progesterone 3,20-bis-(ethylene ketal) in 880 milliliters of chloroform. The heterogeneous mixture was stirred vigorously for two hours at ice bath temperature. The mixture was diluted with 750 milliliters of chloroform and the chloroform phase was separated, washed with five percent sodium bicarbonate, water, and evaporated to dryness under reduced pressure. The white solid residue was recrystallized from acetone to give 15.95 grams of 5α,6α-oxido-11α-acetoxyallopregnane-3,20-dione 3,20-bis-(ethylene ketal), melting point 240–255 degrees. Part of the mother liquor containing 2.05 grams of solids was chromatographed over 100 grams of Florisil to give an additional amount of 5α,6α- oxido-11α-acetoxyallopregnane-3,20-dione 3,20-bis-(ethylene ketal). Fractions of 200 milliliters were taken as shown in Table I:

TABLE I

| Fractions | Solvent |
| --- | --- |
| 1–5 | Skellysolve B-hexanes:acetone 92.5:7.5. |
| 6–10 | Skellysolve B-hexanes:acetone 90:10. |
| 11–15 | Skellysolve B-hexanes:acetone 85:15. |
| 16–20 | Skellysolve B-hexanes:acetone 80:20. |
| 21 | Acetone. |

Fractions 10 to 15, inclusive, were combined to give 374 milligrams of 5α,6α-oxido-11α-acetoxyallopregnane-3,20-dione 3,20-bis-(ethylene ketal).

Fractions 2–4 obtained from the column were combined and crystallized from acetone to give 1.36 grams of the 5β,6β-oxide isomer, melting point 210–217 degrees. An analytical sample of 5α,6α-oxido-11α-acetoxyallopregnane-3,20-dione 3,20-bis-(ethylene ketal) prepared by recrystallization from acetone melted at 254–256 degrees, $[\alpha]_D$ minus 59 degrees in chloroform.

Analysis.—Calcd. for $C_{27}H_{40}O_7$: C, 68.04; H, 8.46. Found: C, 67.82; H, 8.47.

An analytical sample of the 5β,6β-oxide isomer melted at 215–218 degrees, $[\alpha]_D$ minus nineteen degrees in chloroform.

Analysis.—Calcd. for $C_{27}H_{40}O_7$: C, 68.04; H, 8.46. Found: C, 68.40; H, 8.66.

In the same manner 11α-acetoxy-5α,6α-oxidopregnane-3,20-dione 3,20-bis-(ethylene ketal) is obtained by substituting performic or perbenzoic acid for the peracetic acid.

EXAMPLE 2

5α,6α-oxido-11α-hydroxypregnane-3,20-dione 3,20-bis-(ethlyene ketal)

In the same manner as shown in Example 1, reacting 11α-hydroxyprogesterone 3,20-bis-(ethylene ketal) with peracetic acid and anhydrous sodium acetate in chloroform solution produced 5α,6α-oxido-11α-hydroxypregnane-3,20-dione 3,20-bis-(ethylene ketal).

In the same manner as shown in Examples 1 and 2, other 5α,6α-oxido-11α-hydroxy and 11α-acyloxypregnane-3,20-dione 3,20-bis-(alkylene ketals) are prepared by reacting the corresponding 11α-hydroxy- or 11α-acyloxyprogesterone bis-ketal with a peracid, such as performic, peracetic, perbenzoic, perphthalic acid, at low temperatures usually between minus ten and plus ten degrees centigrade. Representative compounds thus prepared comprise 5α,6α-oxido-11α-hydroxypregnane-3,20-dione 3,20-bis-(1,2-propylene ketal), 5α,6α-oxido-11α-hydroxy-pregnane-3,20-dione 3,20-bis-(1,3-propylene ketal), 5α,6α-oxido-11α-hydroxypregnane-3,20-dione 3,20-bis-(1,2-butylene ketal), the 2,3- and the 1,3-butylene ketal, the 1,2-, 2,3-, 2,4- and 3,5-pentylene ketals, 1,2-, 1,3-hexylene, 1,2-, 1,3-heptylene, 1,2-, 1,3-octylene ketals of 5α,6α-oxido-11α-hydroxypregnane-3,20-dione, 5α,6α-oxido-11α-propionyloxypregnane-3,20-dione 3,20-bis-(ethylene ketal), 5α,6α-oxido-11α-benzoyloxypregnane-3,20-dione 3,20-bis-(ethylene ketal), 5α,6α-oxido-11α-acetoxypregnane-3,20-dione 3,20-bis-(propylene ketal), and the like.

EXAMPLE 3

5α,11α-dihydroxy-6β-methylallopregnane-3,20-dione 3,20-bis-(ethylene ketal)

To five milliliters of three molar ether solutions of methyl magnesium bromide was dropwise added a solution of 476 milligrams of 5α,6α-oxido-11α-acetoxypregnane-3,20-dione 3,20-bis-(ethylene ketal) in twenty milliliters of distilled tetrahydrofuran. Addition was at such a rate as to keep the reflux from becoming too violent. The reaction mixture was allowed to stir and reflux for seventeen hours and was then cooled and 25 milliliters of iced saturated ammonium chloride solution was added. After stirring for a few minutes the mixture was extracted with ether and the ether was washed with water, dried over anhydrous sodium sulfate and allowed to evaporate to dryness. The residue was crystallized from acetone-Skellysolve B hexanes to give 305 milligrams of 5α-11α-dihydroxy-6β-methylallopregnane, 3,20-dione 3,20-bis-(ethylene ketal) melting point 151–155 degrees. The analytical sample, recrystallized from isopropyl ether, melted at 153–154 degrees; $[\alpha]_D$ minus thirty degrees in chloroform.

Analysis.—Calcd. for $C_{26}H_{42}O_6$: C, 69.30; H, 9.40. Found: C, 69.70; H, 9.44.

EXAMPLE 4

5α,11α-dihydroxy-6β-methylpregnane-3,20-dione

In the same manner as shown in Example 3, treating a solution of 5α,6α-oxido-11α-hydroxypregnane-3,20-dione 3,20-bis-(ethylene ketal) in benzene-tetrahydrofuran solution with methyl magnesium iodide in ether resulted in 5α,11α-dihydroxy-6β-methylpregnane-3,20-dione 3,20-bis-(ethylene ketal).

In the same manner as shown in Examples 3 and 4, other bis-ketals such as the 1,2-propylene, 1,3-propylene, 1,2- and 1,3-butylene bis-ketals of 5α,6α-oxido,11α-hydroxypregnane-3,20-dione and 5α,6α-oxido-11α-acyloxypregnane-3,20-dione when reacted with methyl magnesium bromide or iodide in solution such as tetrahydrofuran, benzene, ether, or mixtures thereof, or the like, give the corresponding 5α,11α-dihydroxy-6β-methylpregnane-3,20-dione 3,20-bis-ketals. Representative compounds thus produced include: 5α,11α-dihydroxy-6β-methyl-pregnane-3,20-dione 3,20-bis-(1,2-propylene ketal), 5α,11α-dihydroxy-6β-methylpregnane-3,20-dione 3,20-bis-(1,3-propylene ketal), 5α,11α-dihydroxy-6β-methylpregnane-3,20-dione 3,20-bis-(1,2-butylene ketal), 5α,11α-dihydroxy-6β-methylpregnane-3,20-dione 3,20-bis-(1,3-butylene ketal), 5α,11α-dihydroxy-6β-methylpregnane-3,20-dione 3,20-bis-(1,2-pentylene ketal), 5α,11α-dihydroxy-6β-methylpregnane-3,20-dione 3,20-bis-(1,3-hexylene ketal), 5α,11α-dihydroxy-6β-methylpregnane-3,20-dione 3,20-bis-(2,4 hexylene ketal), and the like.

In the same manner as shown in Examples 3 and 4, reacting 5α,6α-oxido-11α-hydroxy- and 11α-acyloxyallopregnane-3,20-dione 3,20-bis-(alkylene ketals) with alkyl magnesium halides, such as ethyl, propyl, isopropyl, butyl, isobutyl, pentyl, hexyl, magnesium iodide or magnesium bromide or the like or an aryl magnesium halide such as phenyl magnesium iodide yields the corresponding 5α,11α-dihydroxy-6-alkly- or 5α,11α-dihydroxy-6-aryl-allopregnane-3,20-dione 3,20-bis-(alkylene ketal) wherein the alkyl group may be ethyl, propyl, isopropyl, butyl, isobutyl, pentyl, hexyl, or the like, and the aryl group may be phenyl or the like.

Treating at a temperature between zero and thirty degrees a 5α,11α-dihydroxy-6-alkyl- or a 5α,11α-dihydroxy-6-arylallopregnane-3,20-dione 3,20-bis-(alkylene ketal) with an acylating agent, such as an organic carboxylic acid anhydride or halide preferably in pyridine solution yields the corresponding 11α-esters of the starting material. Representative esters thus obtained include the 11α-acetate, propionate, butyrate, hexanoate, octanoate, benzoate, phenylacetate, phenylpropionate, and the like, of 5α,11α-dihydroxy-6β-methylallopregnane-3,20-dione 3,20-bis-(ethylene ketal) and other 5α,11α-dihydroxy-6-alkyl- or 5α,11α-dihydroxy-6-arylallopregnane-3,20-dione 3,20-bis-(alkylene ketals).

EXAMPLE 5

5α,11α-dihydroxy-6β-methylallopregnane-3,20-dione

A solution of 459 milligrams of 5α,11α-dihydroxy-6β-methylallopregnane-3,20-dione 3,20-bis-(ethylene ketal) in ten milliliters of acetone and one milliliter of one Normal sulfuric acid was gently boiled on the steam bath for ten minutes. The solution was cooled to room temperature, twenty milliliters of water was added (crystallization took place) and refrigerated to give 335 milligrams of 5α,11α-dihydroxy-6β-methylallopregnane-3,20-dione of melting point 210 to 223 degrees centigrade. The analytical sample, recrystallized from acetone, melted at 234 to 235 degrees centigrade, rotation [α]$_D$ plus 48 degrees in chloroform.

Analysis.—Calcd. for $C_{22}H_{34}O_4$: C, 72.89; H, 9.45. Found: C, 73.09; H, 9.51.

Example 6

5α,11α-dihydroxy-6β-methylallopregnane-3,20-dione

In the same manner given in Example 5, hydrolyzing 5α,11α-dihydroxy-6β-methylallopregnane-3,20-dione 3,20-bis-(1,2-propylene ketal) with hydrochloric acid in tertiary butyl alcohol produced 5α,11α-dihydroxy-6β-methylallopregnane-3,20-dione.

In the same manner given in Examples 5 and 6, hydrolyzing with mineral acids such as sulfuric, hydrochloric, perchloric, and the like, or organic acids such as a formic, acetic, or toluenesulfonic acid or the like, other 5α,11α-dihydroxy-6-alkyl- or 5α,11α-dihydroxy-6-arylallopregnane-3,20-dione 3,20-bis-(alkylene ketals), especially 5α,11α-dihydroxy-6-methylallopregnane-3,20-dione 3,20-bis-(alkylene ketals), yields the corresponding 5α,11α-dihydroxy-6-alkyl or 5α,11α-dihydroxy-6-arylallopregnane-3,20-diones.

Treating 5α,11α-dihydroxy-6-alkyl- or respectively 5α,11α-dihydroxy-6-arylallopregnane-3,20-diones with an acylating agent such as an organic carboxylic acid halide or anhydride at a temperature between zero and forty degrees centigrade gives the corresponding 11α-esters. Representative 11α-esters thus produced include: the 11α-acetate, propionate, butyrate, isobutyrate, valerate, isovalerate, hexanoate, heptanoate, octanoate, benzoate, phenylacetate, phenylpropionate of 5α,11α-dihydroxy-6-alkyl- or respectively 5α,11α-dihydroxy-6-arylallopregnane-3,20-dione and in particular the 11α-esters as mentioned above of 5α,11α-dihydroxy-6β-methylallopregnane-3,20-dione.

Example 7

6-methyl-11α-hydroxyprogesterone

Nitrogen was bubbled through a solution of two grams of 5α,11α-dihydroxy-6β-methylallopregnane-3,20-dione in 360 milliliters of ethanol denatured with methanol for fifteen minutes. To this solution was added eighteen milliliters of 0.1 N sodium hydroxide solution which had been likewise treated with nitrogen. The mixture was allowed to stand under nitrogen for 21 hours, made slightly acid with acetic acid, and concentrated under reduced pressure, under sixty degrees centigrade to dryness. The residue was dissolved in 200 milliliters of ether and twenty milliliters of water, and the ether layer was separated, washed with dilute sodium bicarbonate and water, dried and evaporated to dryness to give 1.722 grams of 6-methyl-11α-hydroxyprogesterone containing essentially 6β-methyl-11α-hydroxyprogesterone and some 6α-methyl epimer.

Example 8

6-methyl-11α-acetoxyprogesterone

A solution was prepared containing 200 milligrams of 6-methyl-11α-hydroxyprogesterone in one milliliter of pyridine. Thereto was added one milliliter of acetic anhydride and the mixture was allowed to stand for four hours at room temperature (approximately 24 degrees centigrade). The mixture was then poured into twenty milliliters of ice water and extracted with three ten-milliliter portions of methylene chloride. The methylene chloride portions were combined, washed several times with water, dried over anhydrous sodium sulfate, evaporated to dryness and the residue twice recrystallized from acetone to give pure 6-methyl-11α-acetoxyprogesterone.

Example 9

6-methyl-11α-propionyloxyprogesterone

In the manner given in Example 8, treating 6α-methyl-11α-hydroxyprogesterone with propionic anhydride in pyridine solution yields 6-methyl-11α-propionyloxyprogesterone.

Example 10

6-methyl-11α-hexanoyloxyprogesterone

In the manner given in Example 8, treating 6-methyl-11α-hydroxyprogesterone with hexanoyl bromide in pyridine solution yields 6 - methyl - 11α - hexanoyloxyprogesterone.

Example 11

6-methyl-11α-benzoyloxyprogesterone

In the manner given in Example 8, treating 6-methyl-11α-hydroxyprogesterone with benzoyl chloride in pyridine solution yields 6 - methyl - 11α - benzoyloxyprogesterone.

Example 12

6-methyl-11α-(p-toluenesulfonyloxy)-progesterone

In the manner given in Example 8, treating 6-methyl-11α-hydroxyprogesterone with p-toluenesulfonyl chloride in pyridine solution yields 6-methyl-11α-(p-toluenesulfonyloxy)-progesterone.

In the same manner given in Examples 8 through 12, treating 6-methyl-11α-hydroxyprogesterone with other acid anhydrides or acid halides, especially of organic carboxylic acids and preferably of hydrocarbon carboxylic acids containing from one to eight carbon atoms, inclusive, yields the corresponding 6-methyl-11α-acyloxyprogesterone wherein the acyloxy group can be butyryloxy, isobutyryloxy, valeryloxy, isovaleryloxy, heptanoyloxy, octanoyloxy, toluyloxy, anisoyloxy, cinnamyloxy, β-cyclopentylpropionoxy, phenylacetoxy, benzenesulfonyloxy, furoyloxy, nicotinyloxy, and the like.

In the same manner as shown in Example 7, treating with potassium hydroxide in ethanol or methanol, 5α,11α-dihydroxy-6-alkylallopregnane-3,20-dione or 5α,11α-dihydroxy-6-arylallopregnane-3,20-dione, wherein the alkyl group may be ethyl, propyl, isopropyl, butyl, isobutyl, pentyl, hexyl, heptyl, octyl, or the like, and the aryl group may be phenyl, tolyl, or the like, produces the corresponding 6-alkyl or respectively 6-aryl-11α-hydroxyprogesterone such as, for example, 6-ethyl-11α-hydroxyprogesterone, 6-propyl-11α-hydroxyprogesterone, 6-butyl-11α-hydroxyprogesterone, 6-pentyl-11α-hydroxyprogesterone, 6-hexyl-11α-hydroxyprogesterone, 6 - phenyl-11α-hydroxyprogesterone, and the like. Such 6-alkyl-11α-hydroxyprogesterones and 6-aryl-11α-hydroxy-progesterone can be esterified as shown in Examples 8 through 12 to give the corresponding 11α-esters such as for instance 6-ethyl-11α-acetoxyprogesterone, 6α-propyl-11α-butyryloxy-progesterone, 6α-pentyl-11α-benzoyloxyprogesterone, and the like.

Example 13

6β-methyl-11-ketoprogesterone

A solution was prepared containing 1.722 grams of 6β-methyl-11α-hydroxyprogesterone (Example 7) in 120 milliliters of acetic acid. To this solution was added 0.41 gram of chromic anhydride, dissolved in 41 milliliters of acetic acid containing 0.4 milliliter of water. The temperature during the addition of the chromic anhydride was kept between eighteen and 22 degrees centigrade for a period of 1.5 hours after the addition was completed. The reaction mixture was diluted with 600 milliliters of water and extracted with six 100-milliliter portions of methylene chloride. The methylene chloride extracts were combined, washed with dilute sodium bicarbonate solution, then with water, dried over anhydrous sodium sulfate and evaporated to dryness under reduced pressure to give a residue. The thus obtained solid residue was recrystallized twice from methanol to give 1.37 grams of 6β-methyl-11-ketoprogesterone of melting point 172.5 to 175 degrees and rotation [α]$_D$ of plus 203 degrees (in chloroform).

Analysis.—Calcd. for $C_{22}H_{30}O_3$: C, 77.15; H, 8.83. Found: C, 77.32; H, 8.47.

In the same manner as given in Example 13, oxidizing with chromic anhydride in acetic acid, or with sodium dichromate, potassium dichromate in acetic or dilute sulfuric acid solution, a 6-alkyl-11α-hydroxyprogesterone or a 6-aryl-11α-hydroxyprogesterone gives the corresponding 6-alkyl- or respectively 6-aryl-11-ketoprogesterone. Representative 6-alkyl-11-ketoprogesterone and 6-aryl-11-ketoprogesterone thus produced include the 6-ethyl-11-ketoprogesterone, 6-propyl-11-ketoprogesterone, 6-butyl-11-ketoprogesterone, 6 - pentyl - 11 - ketoprogesterone, 6-hexyl-11-ketoprogesterone, 6-phenyl-11-ketoprogesterone, 6-isopropyl-11-ketoprogesterone, 6-isobutyl-11-ketoprogesterone, and the like.

Example 14

6α-methyl-11-ketoprogesterone

A solution of two grams of 5α,-11α-dihydroxy-6β-methyl-allopregnene-3,20-dione in 120 milliliters of acetic acid at twenty degrees was prepared. To this solution was added dropwise 0.41 gram of chromium trioxide in 41 milliliters of acetic acid and 0.4 milliliter of water. The temperature was maintained at nineteen to 23 degrees centigrade during the addition and for one and one-half hours thereafter. The reaction mixture was diluted with 600 milliliters of water and extracted with six 100-milliliter portions of methylene chloride. The extract was washed with dilute sodium bicarbonate solution and water, dried and evaporated to dryness under reduced pressure. Recrystallization of the solid residue from methanol gave 1.56 grams of 5α-hydroxy-6β-methylallopregnane-3,11,20-trione of melting point 233 to 242 degrees centigrade.

The 1.56 grams of 5α-hydroxy-6β-methylallopregnane-3,11,20-trione, thus obtained, were dissolved in a mixture of 300 milliliters of ethanol denatured with methanol and fifteen milliliters of 0.1 normal sodium hydroxide solution. The mixture was allowed to stand in a nitrogen atmosphere for a period of twenty hours, was then acidified with acetic acid and concentrated under reduced pressure to dryness. The residue thus obtained was dissolved in 150 milliliters of ether and fifteen milliliters of water and the ether separated, washed with dilute sodium bicarbonate and water and evaporated to dryness to give 0.96 gram of crude 6α-methyl-11-ketoprogesterone. Recrystallizing the crude 6α-methyl-11-ketoprogesterone from ethyl acetate produced pure 6α-methyl-11-ketoprogesterone of melting point 160 to 165 degrees centigrade and rotation [α]$_D$ plus 241 degrees in chloroform.

Analysis.—Calcd. for $C_{22}H_{30}O_3$: C, 77.15; H, 8.83. Found: C, 77.02; H, 8.65.

Example 14A

6α-methyl-11-ketoprogesterone from 6β-methyl-11-ketoprogesterone

A solution was prepared containing 100 milligrams of 6β-methyl-11-ketoprogesterone in eighteen milliliters of absolute ethanol denatured with methanol. To this solution was added 0.9 milliliter of 0.1 normal sodium hydroxide solution, dissolved in eighteen milliliters of the same denatured ethanol described above. The mixture was allowed to stand for a period of eighteen hours, then acidified with acetic acid, concentrated to dryness and extracted with three ten-milliliter portions of ether. The ether extracts were combined, washed with water and evaporated to give a residue which was recrystallized three times from ethyl acetate to give 21 milligrams of 6α-methyl-11-ketoprogesterone of the same physical constants as above.

Treatment of 6α - methyl-11-ketoprogesterone with either acid or base under the above reaction conditions does not produce epimerization to 6β-methyl-11-ketoprogesterone.

Example 15

6α-methylhydrocortisone from 6-methyl-11-ketoprogesterone (A) 6-METHYL-3,11-DIKETO-4,17(20)-PREGNADIENE-21-OIC ACID METHYL ESTER A solution of 6.84 grams (0.02 mole) of 6-methyl-11-ketoprogesterone (6α and 6β-epimers) in seventy milliliters of tertiarybutyl alcohol was prepared by heating to 55–60 degrees with stirring under a nitrogen atmosphere. While the temperature was held at this point 11.7 grams of ethyl oxalate was added. Thereafter 2.7 grams of sodium methoxide in methanol (commerical 25% solution) was added. Almost immediately the yellow precipitate of the disodium enolate of 6-methyl-21,21-diethoxyoxalyl-11-ketoprogesterone began to precipitate. The temperature was maintained at fifty to sixty degrees centigrade for fifty minutes after which the mixture was allowed to cool slowly to approximately 35 degrees centigrade in the next fifteen minutes.

A solution of 2.44 grams of anhydrous sodium acetate and 3.00 grams of glacial acetic acid in 160 milliliters of methanol which had been previously cooled to ten degrees centigrade was then added and the mixture stirred until the solution was achieved. The yellow solution was cooled to zero degrees and treated dropwise with vigorous stirring with a pre-cooled (to zero degrees centigrade) solution of 9.6 grams of bromine in 96 milliliters of methanol. Approximately 75 milliliters of the bromine solution was added at a constant rate during ten minutes. The rate of addition was then decreased and the remaining 21 milliliters added during the following ten minutes. After an additional ten-minute stirring period, the bromine color had essentially disappeared.

With continuous stirring and cooling a solution of 5.57 grams of sodium methoxide in methanol (commercial 25 percent solution) was added rapidly. A bright orange color developed which soon faded to yellow amber. The cooling bath was removed, the temperature raised to 25–30 degrees centigrade and the solution stirred for 1.5 hours. During this period crystallization occurred, the precipitated material being the 2-bromo-6-methyl-3,11-diketo-4,17(20)-pregnadiene-21-oic acid methyl ester.

Sixteen milliliters of acetic acid and 3.2 grams of zinc dust was added to this material and stirring continued for a period of thirty minutes. The excess zinc dust was removed by filtration and washed with fifteen to twenty milliliters of fresh methanol. The combined filtrate was concentrated at reduced pressure in a sixty-degree water bath to approximately a 200-milliliter volume. The concentrate was poured slowly with stirring into 750 milliliters of ice and water. The mixture was refrigerated for fifteen minutes and then filtered. The filter cake was washed with 100 milliliters of cold water and dried at room temperature. The slightly gummy crude product, 6-methyl-3,11-diketo-4,17(20)-pregnadiene - 21 - oic acid methyl ester weighed 7.02 grams (94.8 percent yield).

1.5 gram portion of the crude material was dissolved in fifty milliliters of benzene and poured onto a chromatographic column, previously charged with 75 grams of Florisil synthetic magnesium silicate. The column was eluted with 750 milliliters of five percent acetone-95 percent Skellysolve B hexane, 1200 milliliters of eight percent acetone-92 percent Skellysolve B hexane, 300 milliliters of twelve percent acetone-88 percent Skellysolve B hexane, and 150 milliliters of 100 percent acetone. The eluate was collected in 150-milliliter fractions and evaporated. Fractions 5–10, inclusive, contained 939 milligrams of crystalline product which was recrystallized from methanol to give 660 milligrams of white needles of pure 6-methyl-3,11-diketo-4,17(20)-pregnadien-21-oic acid methyl ester of melting point 227–229 degrees centigrade, $[\alpha]_D$ plus 131 degrees in chloroform $\lambda_{max.}^{ethanol\ (95\%)}$ 234 millimicrons, $a_M = 23,110$

*Analysis.*—Calcd. for $C_{23}H_{30}O_4$: C, 74.56; H, 8.16. Found: C, 74.65; H, 8.12.

(B) 6-METHYL-11β,21-DIHYDROXY-4,17(20)-PREGNADIEN-3-ONE 3-PYRROLIDINE ENAMINE

A solution of 0.5 gram of 6-methyl-3,11-diketo-4,17(20)-pregnadien-21-oate methyl ester, 0.5 milliliter of pyrrolidine, forty milliliters of benzene and twenty milligrams of p-toluene-sulfonic acid was heated under reflux for one hour. The solvent was distilled under vacuum. Trituration of the residue with methanol gave 398 milligrams of a yellow solid (68.2 percent yield) of the 3-pyrrolidine enamine of 6-methyl-3,11-diketo-4,17(20)-pregnadien-21-oic acid methyl ester of melting point 136–148 degrees centigrade and λ max. 272 millimicrons (measured in five percent water plus 95 percent methanol); $a_M = 21,450$; λ max. 224 millimicrons, $a_M = 16,650$; λ max. 360 millimicrons, $a_M = 1,200$.

*Analysis.*—Calcd. for $C_{27}H_{37}NO_3$: C, 76.56; H, 8.81; N, 3.31. Found: C, 76.42; H, 9.02; N, 3.37.

(C) 3-PYRROLIDINE ENAMINE OF 6-METHYL-11β,21-DIHYDROXY-4,17(20)-PREGNADIEN-3-ONE

To a suspension of 1.1 grams of lithium aluminum hydride in 75 milliliters of anhydrous ether was added 1.3 grams of the crude 3-pyrrolidine enamine of 6-methyl-3,11-diketo-4,17(20)-pregnadien-21-oic acid methyl ester. The reaction mixture was heated under reflux for one hour. The excess lithium aluminum hydride was destroyed by the addition of ethyl acetate. Water was added until a pasty mass of lithium salts were formed. The supernatant liquid was decanted and evaporated yielding 1.17 grams of a yellow oil consisting essentially of the 3-enamine of 6-methyl-11β,21-dihydroxy-4,17(20)-pregnadien-3-one.

(D) 6α-METHYL-11β,21-DIHYDROXY-4,17(20)-PREGNADIEN-3-ONE

The yellow oil consisting of impure 3-enamine 6-methyl-11β,21-dihydroxy-4,17(20)-pregnadien-3-one was dissolved in twenty milliliters of methanol containing two milliliters of five percent sodium hydroxide. After 1.5 hours at 26 degrees the solution was neutralized with acetic acid, and the crude product, 1.13 grams, was obtained by extraction after distillation of the methanol. This material was chromatographed over Florisil and a fraction of 306 milligrams obtained by elution with Skellysolve B containing twenty percent acetone, was recrystallized from ethyl acetate to give 240 milligrams of 6α-methyl-11β,21 - dihydroxy - 4,17(20)-pregnadien-3-one of melting point 178–179 degrees centigrade.

(E) 6α-METHYL-11β-DIHYDROXY-21-ACETOXY-4,17(20)-PREGNADIEN-3-ONE

A solution of 100 milligrams of 6-methyl-11β,21-dihydroxy-4,17(20)-pregnadien-3-one in one milliliter of pyridine was mixed with one milliliter of acetic anhydride and the whole was then maintained at room temperature for a period of seventeen hours, whereafter crushed ice was added thereto. The oily precipitate, 6α-methyl-11β-hydroxy-21-acetoxy-4,17(20)-pregnadien-3-one, was extracted with three ten-milliliter portions of methylene chloride, the methylene chloride extracts dried over anhydrous sodium sulfate, evaporated and the residue, 111 milligrams, recrystallized from ethyl acetate-Skellysolve B to give 6α-methyl-11β-hydroxy-21-acetoxy-4,17(20)-pregnadien-3-one of melting point 136–139 degrees centigrade.

(F) 6α-METHYLHYDROCORTISONE ACETATE 100 milligrams of 6α-methyl-11β-hydroxy-21-acetoxy-4,17(20)-pregnadien-3-one were dissolved in six milliliters of tertiary butyl alcohol and 0.05 milliliter of pyridine. To this mixture was added 1.6 milligrams of osmium tetroxide and 0.21 milliliter of N-methylmorpholine oxide peroxide (equal to 35.8 milliliters of a tenth normal sodium thiosulfate solution). After stirring at 26 degrees centigrade for a period of two hours, excess sodium hydrosulfite solution was added. The solvent was distilled in a vacuum and the product extracted with methylene dichloride. The material was chromatographed over Florisil anhydrous magnesium sulfate and the fraction consisting of Skellysolve B hexanes with fifteen percent acetone was separated, and evaporated to give 52 milligrams of crystalline 6α-methylhydrocortisone acetate of melting point 213–214 degrees centigrade.

*Analysis.*—Calcd. for $C_{24}H_{34}O_6$: C, 68.87; H, 8.19. Found: C, 68.60; H, 8.41.

(G) 6α-METHYL-11β,17α,21-TRIHYDROXY-4-PREGNENE-3,20-DIONE (6α-METHYLHYDROCORTISONE)

A solution was prepared containing 0.5 gram of 6α-methyl-11β,17α-dihydroxy - 21 - acetoxy-4-pregnene-3,20-dione in 25 milliliters of methanol. This solution was purged with oxygen free nitrogen for a period of five minutes and thereafter was added a similarly oxygen purged solution of 0.250 gram of potassium bicarbonate, dissolved in one milliliter of methanol and one milliliter of water. The mixture was allowed to stand for three hours in a nitrogen atmosphere, then neutralized with hydrochloric acid, poured into 200 milliliters of ice water and the thus obtained mixture extracted with four portions of fifty milliliters of methylene chloride. The methylene chloride extracts were combined, washed several times with water, dried over anhydrous sodium sulfate and evaporated to give 6α-methylhydrocortisone which was recrystallized three times from methanol and water to give pure 6α-methylhydrocortisone of melting point 203 to 208 degrees centigrade.

*Analysis.*—Calcd. for $C_{22}H_{32}O_5$: C, 70.18; H, 8.57. Found: C, 70.32; H, 8.50.

(H) 6α-METHYLHYDROCORTISONE BENZOATE

A mixture of 500 milligrams of 6α-methylhydrocortisone, five milliliters of pyridine and five milliliters of benzoyl chloride was allowed to stand at room temperature for a period of eight hours. Thereafter the mixture was poured into excess of water, the water extracts neutralized with sodium bicarbonate and thereupon the mixture refrigerated. The mixture was then filtered and the thus obtained 6α-methylhydrocortisone benzoate recrystallized from methanol to give pure 6α-methylhydrocortisone benzoate.

In the same manner as given above, treating in pyridine solution:

(α) 6α-methylhydrocortisone with propionic anhydride yielded 6α-methylhydrocortisone 21-propionate.

(β) 6α-methylhydrocortisone with butyric anhydride yielded 6α-methylhydrocortisone 21-butyrate.

(I) 6α-METHYLCORTISONE

To 760 milligrams (2.02 millimoles) of 6α-methylhydrocortisone (6α-methyl-11β, 17α,21-trihydroxy-4-pregnene-3,20-dione) in 32 milliliters of methanol was added 0.67 milliliter of pyridine, 1.34 milliliters of water and 560 milligrams (4.04 millimoles) of N-bromoacetamide. The reaction mixture was held at twelve degrees centigrade overnight when titration of an aliquot indicated that approximately 1.1 mole equivalents of oxidant had been used. At this time sixty milliliters of a dilute solution of sodium sulfite (containing 400 milligrams of sodium sulfite) was added to destroy excess N-bromoacetamide and the mixture was concentrated under reduced pressure to about 55 milliliters until copious crystallization occurred. The mixture was cooled to zero degrees centigrade, maintained at this temperature for three hours and filtered to yield 610 milligrams of 6α-methylcortisone.

Since the product gave a positive Beilstein test, it was dissolved in 36 milliliters of acetic acid and treated with 1.2 grams of powdered zinc at room temperature for two hours. The mixture was filtered and the filtrate concentrated to ten milliliters under reduced pressure. The addition of fifty milliliters of water caused crystallization. The crystals were filtered off and washed with water and dried to yield 360 milligrams of 6α-methylcortisone of melting point 207–207.5. Recrystallization from acetone gave 230 milligrams of melting point 212.5–215 degrees. The infrared absorption spectrum of 6α-methylcortisone in Nujol mineral oil is as follows:

| | | |
|---|---|---|
| OH | 3,400 cm.$^{-1}$ | 3,305 cm.$^{-1}$ |
| 11- and 20-keto | 1,717 cm.$^{-1}$ | 1,700 cm.$^{-1}$ |
| conjugated 3-keto | 1,652 cm.$^{-1}$ | |
| Δ$^4$-double bond | 1,604 cm.$^{-1}$ | |

Treating 6α-methylhydrocortisone or 6α-methylcortisone with Septomyxa affinis in a nutrient solution preferably in the presence of 3-ketobisnor-4-cholen-22-al produces the respective 1-dehydro compounds, 1-dehydro-6α-methylhydrocortisone and 1-dehydro-6α-methylcortisone which are extremely active glucocorticoid steroids without salt-retaining activity.

Another method to produce 1-dehydro-6-methylhydrocortisone is as follows:

(J) 1-DEHYDRO-6α-METHYLHYDROCORTISONE FROM 6α-METHYL-11β,21-DIHYDROXY-4,17(20)-PREGNADIEN-3-ONE

Five 100-milliliter portions of a medium in 250-milliliter Erlenmeyer flasks containing one percent Cerelose corn sugar, two percent corn steep liquor (60 percent solids) and tap water was adjusted to a pH of 4.95. This medium was sterilized for one hour at twenty pounds per square inch pressure and 120 degrees centigrade and inoculated with a one to two day growth of Septomyxa affinis A.T.C.C. 6737. The Erlenmeyer flasks were shaken at room temperature at about 24 degrees centigrade for a period of three days. At the end of this period, this 500-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/10 l. beer). After nineteen hours of incubation, when a good growth developed and the acidity rose to pH 6.65, two grams of 6α-methyl-11β,21-dihydroxy-4,17(20)-pregnadien-3-one, dissolved in fifty milliliters of acetone, was added and the incubation (conversion) carried out at the same temperature and aeration for nineteen hours (final pH 8.0). The mycelium was filtered off and the steroidal material was extracted with four three-liter portions of methylene chloride. The mycelium was extracted with two 500-milliliters portions of acetone and two 500-milliliter portions of methylene chloride. The extracts were combined, evaporated and the residue chromatographed over 160 grams of Florisil synthetic magnesium silicate taking 320-milliliter fractions as follows:

TABLE II

| Fraction | Solvent |
|---|---|
| 1-4 | Skellysolve B hexanes plus 3% acetone. |
| 5-8 | Skellysolve B hexanes plus 6% acetone. |
| 9-12 | Skellysolve B hexanes plus 9% acetone. |
| 13-16 | Skellysolve B hexanes plus 12% acetone. |
| 17 | Skellysolve B hexanes plus 15% acetone. |
| 18 | Do. |
| 19 | Do. |
| 20 | Do. |
| 21 | Skellysolve B hexanes plus 20% acetone. |
| 22 | Do. |
| 23 | Do. |
| 24 | Do. |
| 25 | Do. |
| 26 | Do. |

Fractions 18 to 25 were combined, evaporated to give 1.81 grams and the residue rechromatographed over 120 grams of Florisil taking 240-milliliter fractions.

TABLE III

| Fraction | Solvent |
|---|---|
| 1-4 | Skellysolve B hexanes plus 12% acetone. |
| 5-8 | Skellysolve B hexanes plus 15% acetone. |
| 9 | Skellysolve B hexanes plus 17.5% acetone. |
| 10 | Do. |
| 11 | Do. |
| 12 | Do. |
| 13 | Skellysolve B hexanes plus 20% acetone. |
| 14 | Do. |
| 15 | Do. |
| 17-20 | Skellysolve B hexanes plus 30% acetone. |

Fractions 9–16 were combined and evaporated to give 1.349 grams of an oily material.

This oil crude 6α-methyl-11β,21-dihydroxy-1,4,17(20)-pregnatrien-3-one was dissolved in a mixture of five milliliters of pyridine and four milliliters of acetic anhydride at 25 degrees centigrade and the mixture was allowed to stand for a period of 3.5 hours. Thereafter the reaction mixture was poured into 100 milliliters of ice water and the aqueous mixture extracted with three 75-milliliter portions of methylene chloride. The methylene chloride portions were evaporated and chromatographed over 100 grams of Florisil synthetic magnesium silicate taking 200-milliliter fractions as follows:

TABLE IV

| Fraction | Solvent |
|---|---|
| 1-8 | Skellysolve B hexanes plus 3% acetone. |
| 9-12 | Skellysolve B hexanes plus 6% acetone. |
| 13 | Skellysolve B hexanes plus 9% acetone. |
| 14 | Do. |
| 15 | Do. |
| 16 | Do. |
| 17 | Skellysolve B hexanes plus 12% acetone. |
| 18 | Do. |
| 19 | Do. |
| 20 | Do. |
| 21-24 | Skellysolve B hexanes plus 15% acetone. |

Fractions 14–19 were combined to yield 1.095 gram of partially crystalline material. After three recrystallizations from Skellysolve B-hexane an analytical sample of 6α-methyl-11β-hydroxy-21-acetoxy-1,4,17(20)-pregnatrien-3-one was obtained of melting point 132 to 134 degrees centigrade, rotation [α]$_D$ plus 109 degrees in chloroform, $$\lambda_{max}^{EtOH}\ 243\ m\mu,\ a_M = 15,000$$

*Analysis.*—Calcd. for $C_{24}H_{32}O_4$: C, 74.97; H, 8.39. Found: C, 75.17; H, 8.09.

To 622 milligrams of the above steroid, dissolved in 25 milliliters of tertiary butyl alcohol containing 0.8 milliliter of pyridine, was added four millimoles of N-methyl morpholine oxide peroxide in 2.0 milliliters of tertiary butyl alcohol and 9.8 milligrams of osmium tetroxide in 3.4 milliliters of tertiary butyl alcohol. The mixture was stirred at room temperature (about 22 to 24 degrees centigrade) for ninety minutes at which time twelve milliliters of 0.5 percent aqueous sodium sulfite solution was added. The reaction mixture was stirred for a period of twenty minutes, 25 milliliters of water was added and the tertiary butyl alcohol removed under reduced pressure. The mixture was extracted three times with 25-milliliter portions of methylene dichloride. The extracts were combined, washed with 0.5 normal hydrochloric acid and twice with water, then dried with anhydrous sodium sulfate, filtered, and the filtrate concentrated to dryness to yield 670 milligrams of an oil. The oil was chromatographed over sixty grams of Florisil synthetic magnesium silicate taking fractions of sixty milliliters as follows:

TABLE V

| Fraction | Solvent |
| --- | --- |
| 1-4 | Skellysolve B hexanes plus 3% acetone. |
| 5-8 | Skellysolve B hexanes plus 4% acetone. |
| 9-16 | Skellysolve B hexanes plus 7% acetone. |
| 17-22 | Skellysolve B hexanes plus 10% acetone |
| 23-27 | Skellysolve B hexanes plus 15% acetone. |
| 28-30 | Skellysolve B hexanes plus 20% acetone. |
| 31-38 | Skellysolve B hexanes plus 50% acetone. |
| 39-42 | Acetone. |

Fractions 31 and 32 were combined and crystallized from acetone to give three fractions, fraction A 160 milligrams of melting point 207 to 231 degrees centigrade, fraction B 120 milligrams of melting point 210 to 230 degrees centigrade, and fraction C 40 milligrams of melting point 200 to 204 degrees centigrade.

Fraction A was hydrolyzed with potassium bicarbonate in aqueous methanol solution to give an eighty percent yield 1-dehydro-6α-methylhydrocortisone of melting point 223 to 226.5 degrees centigrade.

Fraction B was recrystallized from acetone-Skellysolve B to give 65 milligrams of 1-dehydro-6-methylhydrocortisone acetate of melting point 205 to 208 degrees centigrade.

Analysis.—Calcd. for $C_{24}H_{32}O_6$: C, 69.21; H, 7.74. Found: C, 69.11; H, 7.67.

Rotation $[\alpha]_D$ was plus 101 degrees in dioxane and ultraviolet absorption spectra $\lambda$ was 243 millimicrons; $a_M = 14,825$.

EXAMPLE 16

*6α-methyl-11β-hydroxyprogesterone*

(A) 6α-METHYL-11-KETOPROGESTERONE 3,20-BIS-(ETHYLENE KETAL)

A mixture of 300 milligrams of 6α-methyl-11-ketoprogesterone, five milliliters of ethylene glycol, fifty milligrams of para-toluenesulfonic acid monohydrate and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for five hours while at the same time being agitated. The water of reaction formed was continuously removed by codistillation with the refluxing benzene and was collected in the water trap. The benzene solution was then washed with successive portions of a dilute sodium bicarbonate solution and water, and then dried. The residue remaining after evaporation of the solvent was crude 6α-methyl-11-ketoprogesterone 3,20-bis-(ethylene ketal) which was recrystallized from ethyl acetate to give pure 6α-methyl-11-ketoprogesterone 3,20-bis-(ethylene ketal). The theoretical structure was confirmed by infrared spectrum analysis:

(B) 6α-METHYL-11β-HYDROXYPROGESTERONE 3,20-BIS-(ETHYLENE KETAL)

To a solution of ten grams of lithium aluminum hydride suspended in 800 milliliters of ether was added ten grams of 6α-methyl-11-ketoprogesterone 3,20-bis-(ethylene ketal), dissolved in 500 milliliters of ether. This mixture was stirred for 45 minutes at room temperature after which time it was refluxed for one hour and then cooled and hydrolyzed with water. The precipitate and water were extracted repeatedly with ether and the combined ether extracts were evaporated after washing with water and drying with anhydrous sodium sulfate. The resulting crystalline residue was essentially a quantitative yield of crude 6α-methyl-11β hydroxyprogesterone 3,20-bis-(ethylene ketal). The structure was confirmed by infrared spectrum analysis.

(C) 6α-METHYL-11β-HYDROXYPROGESTERONE

To a solution of two grams of 6α-methyl-11β-hydroxyprogesterone 3,20-bis-(ethylene ketal), in 75 milliliters of acetone, was added one milliliter of concentrated sulfuric acid in 25 milliliters of water and the resulting acidic admixture allowed to reflux for thirty minutes. The solution was then concentrated and water added until crystallization took place. The thus obtained 6α-methyl-11β-hydroxyprogesterone was collected on a filter and purified by recrystallization from ethyl acetate to give pure 6α-methyl-11β-hydroxyprogesterone.

EXAMPLE 17

*6α-methylcorticosterone (6α - methyl - 11β,21-dihydroxy-4-pregnene-3,20-dione)*

To a solution of one gram of 6α-methyl-11β hydroxyprogesterone in twenty milliliters of tertiary butyl alcohol was added at seventy degrees centigrade in an atmosphere of nitrogen and with stirring, two grams of ethyl oxalate. The temperature was permitted to drop to 55 degrees and 0.5 gram of sodium methoxide in two milliliters of dry methanol was added. The resulting pasty yellow suspension was stirred for fifteen minutes in an atmosphere of nitrogen.

A cooled solution of 0.5 gram of acetic acid in 25 milliliters of methanol was added to the suspension of the thus produced sodium dienolate of 2,21-bis-(ethoxyoxalyl)-6α - methyl - 11β - hydroxyprogesterone to produce a solution of the free dienol in the presence of an excess of sodium acetate. A solution of one gram of iodine in twenty milliliters of methanol was added. The solution was maintained at room temperature for two and one-half hours while stirring was continued under nitrogen to give a solution of 2,21-bis-(ethoxyoxalyl)-6α-methyl-11β-hydroxy-21-iodoprogesterone.

To the resulting solution of 2,21-bis-(ethoxyoxalyl)-6α-methyl-11β-hydroxy-21 - iodoprogesterone was added 6.5 grams of anhydrous potassium acetate and the solution was kept at room temperature for 24 hours. There was thus produced a solution of 2-ethoxyoxalyl-6α-methyl-11β-hydroxy-21-acetoxyprogesterone, resulting from the acetylation of the intermediately produced 2-ethoxyoxalyl-6α-methyl-11β-hydroxy-21-iodoprogesterone.

The solution of 2-ethoxyoxalyl-6α-methyl-11β-hydroxy-21-acetoxyprogesterone was poured into 300 milliliters of ice water containing 0.8 gram of sodium thiosulfate and seven milliliters of five normal sulfuric acid. The precipitated yellow crude 2-ethoxyoxalyl-6α-methyl-11β-hydroxy-21-acetoxyprogesterone was filtered, washed with water, and dried. There was thus obtained approximately 1.2 grams of crude product which gave a negative Beilstein test for halogen and the positive ferric chloride test for enols.

The thus isolated 2-ethoxyoxalyl-6α - methyl-11β-hydroxy-21 - acetoxyprogesterone was dissolved in twenty milliliters of methanol containing one gram of anhydrous sodium acetate. The resulting deep red brown solution cooled to about zero degrees centigrade, there was then slowly added a solution of 0.42 gram of bromine in four milliliters of methanol. This solution containing 2-bromo-2-ethoxyoxalyl-6α - methyl - 11β-hydroxy - 21-acetoxyprogesterone was then mixed with a solution of 0.14 gram of sodium methoxide in 0.6 milliliter of methanol, stirred for one hour at the temperature of the solution and was then permitted to rise to room temperature.

The thus produced reaction product containing 2-bromo-6α - methyl - 11β - hydroxy-21-acetoxyprogesterone was mixed with 1.4 milliliters of glacial acetic acid and 0.6 gram of zinc dust for one hour with vigorous stirring to produce 6α - methyl-11β-hydroxy-21-acetoxyprogesterone (6α-methylcorticosterone 21-acetate). The resulting solution was filtered and the steroid and the filtrate precipitated by pouring into 150 milliliters of ice water. The white amorphous precipitate was filtered and dried to yield crude 6α-methyl-11α-hydroxy - 21 - acetoxyprogesterone which was chromatographed over fifty grams of Florisil anhydrous magnesium silicate. The column was developed with ten fractions of Skellysolve B hexane hydrocarbons containing ten percent acetone and ten fractions of Skellysolve B hexanes containing twenty percent acetone. The fractions containing twenty percent acetone were combined and the solvent distilled to give 6α-methyl-11β-hydroxy-21-acetoxyprogesterone.

A solution was prepared containing one gram of 6α-methyl - 11β - hydroxy - 21 - acetoxyprogesterone, dissolved in 25 milliliters of methanol and two milliliters of water. Thereto was added 0.5 gram of potassium hydroxide, dissolved in five milliliters of methanol. The solution was allowed to stand at room temperature for a period of six hours, and then poured into 200 milliliters of ice water and extracted with three 50-milliliter portions of methylene chloride. The methylene chloride extracts were combined, evaporated, and the thus obtained residue recrystallized three times from metahonal to give pure 6α-methylcorticosterone.

Esterification of 6α-methylcorticosterone with acid anhydrides or halides, the acid being an organic carboxylic acid, preferably a hydrocarbon carboxylic acid containing from one to eight carbon atoms, inclusive, in conventional manner, illustratively by admixing 6-methylcorticosterone in pyridine solution with the selected acyl halide or acid anhydride at room temperautre (twenty to thirty degrees centigrade) produces 6α-methylcorticosterone 21-acylates such as the 21-acetate, propionate, butyrate, isobutyrate, valerate, isovalerate, hexanoate, heptanoate, octanoate, acrylate, trimethylacetate, β-cyclopentylpropionate, benzoate, phenylacetate, tartrate, succinate, maleate, or the like, of 6α-methylcorticosterone.

EXAMPLE 18

*6α-methyl-11-dehydrocorticosterone*

To a solution of 0.2 gram of 6α-methylcorticosterone acetate in four milliliters of acetic acid was added sixty milligrams of chromic anhydride, dissolved in one milliliter of acetic acid and 0.1 milliliter of water. The mixture was allowed to stand at room temperature for a period of four hours, then poured into fifty milliliters of water, neutralized with sodium bicarbonate and extracted with three ten-milliliter portions of methylene chloride. The methylene chloride extracts were combined, washed with water, dried over anhydrous sodium sulfate, evaporated, and the thus produced residue twice recrystallized from methanol to give 6α-methyl-11-dehydrocorticosterone 21-acetate.

Hydrolyzing the thus obtained 6α-methyl-11-dehydrocorticosterone 21-acetate in ethanol solution with sodium hydroxide as shown in Example 17 produces 6α-methyl-11 - dehydrocorticosterone (6 - methyl - 21 - hydroxy - 4-pregnene-3,11,20-trione).

EXAMPLE 19

*6α-methyl-11β-hydroxy-21-fluoroprogesterone*

A solution of one gram of 6α-methylcorticosterone, dissolved in seven milliliters of pyridine, was cooled to zero degrees and thereto was added 0.4 milliliter of methanesulfonyl chloride under stirring. The stirring was continued for a period of two hours at zero degrees centigrade whereafter forty milliliters of water was added. The precipitate was collected on a filter paper, washed with water and air dried to give a white powder of 6α-methylcorticosterone 21-methanesulfonate.

A solution of one gram of crude 21-methanesulfonate of 6α-methylcorticosterone, dissolved in twenty milliliters of boiling acetone, was treated with one gram of sodium iodide in fifty milliliters of acetone. The mixture was stirred at the boiling point for a period of fifteen minutes and thereupon concentrated to approximately one half volume. After cooling to room temperature, a cold solution of 0.2 gram of sodium thiosulfate in forty milliliters of water was added. The mixture was further chilled to a temperature of about five degrees and then filtered. The ivory-colored, crystalline product 6α-methyl - 11β - hydroxy - 21 - iodo - 4 - pregnene - 3,20-dione was washed with water, dried and thus used without further purification for the preparation of the 21-fluoro analogue.

A solution of 0.8 gram of 6α-methyl-11β-hydroxy-21-iodo-4-pregnene-3,20-dione in 160 milliliters of acetonitrile was prepared by heating to the boiling point. After cooling to fifty degrees centigrade, the solution was protected from light and thereto was added 0.6 milliliter of fifty percent aqueous solution of silver fluoride. The solution became cloudy and brown colored. On continued stirring at a temperature between forty to 45 degrees centigrade, additional silver fluoride was added in two one-milliliter portions, thirty minutes apart. Stirring was then continued for a period of two hours. The brown mixture was thereupon filtered through a bed of Celite diatomaceous earth and the filtrate evaporated at reduced pressure from a bath at a temperature of fifty degrees centigrade. The brown residue was thoroughly extracted with four 25-milliliter portions of warm methylene chloride, the methylene chloride extracts concentrated to dryness and the thus obtained residue recrystalized four times from acetone Skellysolve B hexanes to give pure 6α-methyl-11β-hydroxy-21-fluoroprogesterone.

EXAMPLE 20

*6α-methyl-11-keto-21-fluoroprogesterone (6α-methyl-21-fluoro-4-pregnene-3,11,20-trione)*

In the same manner given in Example 18, oxidizing with chromic anhydride in acetic acid 6α-methyl-11β-hydroxyl-21-fluoroprogesterone, instead of the 6α-methyl-11β-hydroxy-21-acetoxyprogesterone of Example 18, yielded 6α-methyl-11-keton-21-fluoroprogesterone.

EXAMPLE 21

*1 - dehydro - 6α - methyl - 11β - hydroxyprogesterone (6α-methyl-11β-hydroxy-1,4-pregnadiene-3,20-dione)*

0.7 gram of 6α-methylprogesterone was dissolved in 45 milliliters of tertiary butyl alcohol and thereto was added 4.5 milliliters of acetic acid and 240 milligrams of selenium dioxide. The mixture was heated to 75 degrees centigrade and stirred for a period of 24 hours. Thereafter another portion of 240 milligrams of selenium dioxide was added and heating at 75 degrees centigrade and stirring continued. The mixture was thereupon cooled, filtered to remove the excess selenium dioxide and evaporated. The thus obtained residue was recrystallized four times from acetone-Skellysolve B hexane hydrocarbons to give pure 1-dehydro-6α-methyl-11β-hydroxyprogesterone.

EXAMPLE 22

*1-dehydro-6α-methyl-11-ketoprogesterone*

In the same manner given in Example 18, oxidizing with chromic anhydride in acetic acid 1-dehydro-6α-methyl-11β-hydroxyprogesterone, instead of the 6α-methyl-11β - hydroxy - 21 - acetoxyprogesterone of Example 18, yielded 1-dehydro-6α-methyl-11-ketoprogesterone.

EXAMPLE 23

*1-dehydro - 6α - methylcorticosterone (6α-methyl-11β,21-dihydroxy-1,4-pregnadiene-3,20-dione)*

In the same manner given in Example 21, 6α-methylcorticosterone acetate was treated with selenium dioxide in tertiary butyl alcohol at seventy to eighty degrees centigrade to yield 1-dehydro-6α-methylcorticosterone acetate.

The thus obtained 1-dehydro-6α-methylcorticosterone acetate, dissolved in methanol, was admixed with a five percent potassium hydroxide solution in 95 percent ethanol, and allowed to stand at room temperature (about 25 degrees centigrade) for a period of six hours. The alcoholic solution was then poured into excess water, neutralized by the addition of dilute hydrochloric acid and extracted with methylene chloride. The methylene chloride extracts were washed with water, dried over anhydrous sodium sulfate, evaporated and the residue recrystallized from acetone-Skellysolve B hexanes to give pure 1-dehydro-6α-methylcorticosterone.

EXAMPLE 24

*1-dehydro-6α-methyl-11-dehydrocorticosterone (6α-methyl-21-hydroxy-1,4-pregnadiene-3,11,20-trione)*

In the same manner given in Example 18, oxidizing with chromic anhydride in acetic acid 1-dehydro-6α-methylcorticosterone acetate yielded 1-dehydro-6α-methyl-11-dehydrocorticosterone acetate.

Hydrolyzing the thus obtained 1-dehydro-6α-methyl-11-dehydrocorticosterone acetate as shown in Example 23 with potassium hydroxide in methanol or ethanol produces 1-dehydro-6α-methyl-*11*-dehydrocorticosterone.

In the same manner as given before, 1-dehydro-6α-methylcorticosterone and 1-dehydro-6α-methyl-11-dehydrocorticosterone can be esterified with acid anhydrides and halides of organic carboxylic acids, preferably hydrocarbon carboxylic acids in pyridine solution at room temperature to give other 21-esters such as the 21-propionate, butyrate, isobutyrate, valerate, isovalerate, hexanoate, heptanoate, octanoate, benzoate, phenylacetate, phenylpropionate, hemisuccinate, hemi-dimethylglutarate, tartrate, β-cyclopentylpropionate, and the like of 1-dehydro-6α-methylcorticosterone or, respectively, of 1-dehydro-6α-methyl-11-dehydrocorticosterone.

EXAMPLE 25

*1-dehydro-6α-methyl-11β-hydroxy-21-fluoroprogesterone (6α-methyl-11β-hydroxy-21-fluoro - 1,4 - pregnadiene-3,20-dione)*

A solution of one gram of 1-dehydro-6α-methylcorticosterone, dissolved in eight milliliters of pyridine, was cooled to zero degrees and thereto was added 0.4 milliliter of methanesulfonyl chloride under stirring. The stirring was continued for a period of two hours at zero degrees centigrade whereafter fifty milliliters of water was added. The precipitated product was collected on a filter, washed with water, and air dried to give a white powder of 1-dehydro-6α-methylcorticosterone 21-methanesulfonate.

A solution of one gram of crude 21-methanesulfonate of 1-dehydro-6α-methylcorticosterone in 25 milliliters of boiling acetate was treated with a solution of 1.1 gram of sodium iodide in ten milliliters of acetone. The mixture was stirred at the boiling point for a period of fifteen minutes and thereupon concentrated to approximately one-half volume. After cooling to room temperature, a cold solution of 0.15 gram of sodium thiosulfate in fifty milliliters of water was added. The mixture was further chilled to a temperature of about five degrees and then filtered. The ivory-colored crystalline product, 6α-methyl-11β-hydroxy-21-iodo - 1,4 - pregnadiene-3,20-dione was washed with water, air dried and thus used for the following step.

A solution of one gram of 6-methyl-11β-hydroxy-21-iodo-1,4-pregnadiene-3,20-dione in 200 milliliters of acetonitrile was prepared by heating to the boiling point. After cooling to 45 degrees centigrade, the solution was protected from light and 0.8 milliliter of fifty percent aqueous solution of silver fluoride was added under stirring. The solution became cloudy and brown colored. Under continued stirring at a temperature between 45 and 50 degrees centigrade, additional silver fluoride solution was added in two 1.5-milliliter portions, one hour apart. Heating and stirring was then continued for a period of two hours. The brown mixture was thereupon filtered through a bed of Celite diatomaceous earth and the filtrate evaporated at reduced pressure from a bath at a temperature of fifty degrees centigrade. The brown residue was thoroughly extracted with four thirty-milliliter portions of warm methylene chloride, the methylene chloride extracts combined, concentrated to dryness, and the thus obtained residue recrystallized four times from methanol Skellysolve B hexanes to give pure 1-dehydro-6α-methyl-11β-hydroxy-21-fluoroprogesterone (6α-methyl-11β-hydroxy-21-fluoro-1,4-pregnadiene-3,20-dione).

EXAMPLE 26

*1-dehydro-6α-methyl-11-keto-21-fluoroprogesterone (6α-methyl-21-fluoro-1,4-pregnadiene-3,11,20-trione)*

In the same manner given in Example 18, oxidizing with chromic anhydride in acetic acid solution 1-dehydro-6α - methyl-11β-hydroxy-21-fluoro-1,4-pregnadiene - 3,20-dione yielded 1-dehydro-6α-methyl-11-keto-21-fluoroprogesterone (6α-methyl-21-fluoro-1,4-pregnadiene-3,11,20-trione).

EXAMPLE 27

*6α-methyl-9α-fluoro-11β-hydroxyprogesterone (6α-methyl-9α-fluoro-11β-hydroxy-4-pregnene-3,20-dione)*

A mixture of one gram of 6α-methyl-11β-hydroxyprogesterone, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.8 gram of 6α-methyl-4,9(11)-pregnadiene-3,20-dione.

0.5 gram of 6α-methyl-4,9(11)-pregnadiene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo-11β-hydroxy-4-pregnene-3,20-dione.

A mixture of 0.45 gram of 6α-methyl-9α-bromo-11β-hydroxy-4-pregnene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B hexanes plus ten percent acetone eluate contained 6α-methyl-9(11)-oxido-4-pregnene-3,20-dione.

A solution of one gram of 6α-methyl-9(11)-oxido-4-pregnene-3,20-dione was dissolved in fifty milliliters of methylene chloride and thereto was added five milliliters of 48 percent hydrofluoric acid. The mixture was stirred vigorously for six hours and then poured into an excess of cold aqueous five percent sodium bicarbonate solution. The methylene chloride layer was separated, dried over anhydrous sodium sulfate and then poured thru a column of 100 grams of Florisil synthetic magnesium silicate. The column was developed with Skellysolve B hexanes and acetone and the fractions containing ten percent acetone were evaporated to dryness and recrystallized from acetone and Skellysolve B hexanes to give pure 6α-methyl-9α-fluoro-11β-hydroxyprogesterone (6α-methyl-9α-fluoro-11β-hydroxy-4-pregnene-3,20-dione).

EXAMPLE 28

*6α-methyl-9α-fluoro-11-ketoprogesterone (6α-methyl-9α-fluoro-4-pregnene-3,11,20-trione)*

Oxidizing in the manner given in Example 18, 6α-methyl-9α-fluoro-11β-hydroxy-4-pregnene-3,20-dione with chromic anhydride in acetic acid solution produces 6α-methyl-9α-fluoro-11-ketoprogesterone (6α-methyl-9α-fluoro-4-pregnene-3,11,20-trione).

EXAMPLE 29

*1-dehydro-6α-methyl-9α-fluoro-11β-hydroxyprogesterone (6α-methyl-9α-fluoro-11β-hydroxy-1,4-pregnadiene-3,20-dione)*

A mixture of one gram of 1-dehydro-6α-methyl-11β-hydroxyprogesterone, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.75 gram of 6α-methyl-1,4,9(11)-pregnatriene-3,20-dione.

0.5 gram of 6α-methyl-1,4,9(11)-pregnatriene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water, and then dried and recrystallized from a mixture of acetone and Skellysolve B hexane hydrocarbons to give 6α-methyl-9α-bromo-11β-hydroxy-1,4-pregnadiene-3,20-dione.

A mixture of 0.45 gram of 6α-methyl-9α-bromo-11β-hydroxy-1,4-pregnadiene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α-methyl-9(11)-oxido-1,4-pregnadiene-3,20-dione.

A solution of one gram of 6α-methyl-9(11)-oxido-1,4-pregnadiene-3,20-dione was dissolved in fifty milliliters of methylene chloride and thereto was added five milliliters of 48 percent hydrofluoric acid. The mixture was stirred vigorously for six hours and then poured into an excess of cold aqueous five percent sodium bicarbonate solution. The methylene chloride layer was separated, dried with anhydrous sodium sulfate and then poured over a column of 100 grams of Florisil synthetic magnesium silicate. The column was developed with Skellysolve B hexanes and acetone, the fractions containing ten percent acetone were evaporated to dryness and recrystallized from acetone and Skellysolve B hexanes to give pure 1-dehydro-6α-methyl-9α-fluoro-11β-hydroxyprogesterone (6α-methyl-9α-fluoro-11β-hydroxy-1,4-pregnadiene-3,20-dione).

EXAMPLE 30

*1-dehydro-6α-methyl-9α-fluoro-11-ketoprogesterone (6α-methyl-9α-fluoro-1,4-pregnadiene-3,11,20-trione)*

Oxidizing in the manner given in Example 18, 6α-methyl-9α-fluoro-11β-hydroxy-1,4-pregnadiene-3,20-dione with chromic anhydride in acetic acid solution produces 1-dehydro-6α-methyl-9α-fluoro-11-ketoprogesterone (6α-methyl-9α-fluoro-1,4-pregnadiene-3,11,20-trione).

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. 11-oxygenated-6-methylprogesterone selected from the group consisting of 6α-methyl-11-ketoprogesterone and 6α-methyl-11β-hydroxyprogesterone.

2. 6α-methyl-11-ketoprogesterone.

3. Compounds selected from the group consisting of 5α,11α-dihydroxy-6β-methylallopregnane-3,20-dione and 5α-hydroxy-6β-methyl-11α-acyloxyallopregnane-3,20-diones wherein the acyl radical is of a hydrocarbon carboxylic acid containing from one to eight carbon atoms, inclusive.

4. 5α,11α-dihydroxy-6β-methylallopregnane-3,20-dione.

5. Compounds selected from the group consisting of 5α,11α-dihydroxy-6β-methylallopregnane-3,20-dione 3,20-bis-(ethylene ketal) and 5α-hydroxy-6β-methyl-11α-acyloxyallopregnane-3,20-dione 3,20-bis-(ethylene ketal) wherein the acyl radical is of a hydrocarbon carboxylic acid containing from one to eight carbon atoms, inclusive.

6. 5α,11α-dihydroxy-6β-methylallopregnane-3,20-dione 3,20-bis-(ethylene ketal).

7. Compounds selected from the group consisting of 5α,6α-oxido-11α-hydroxyallopregnane-3,20-dione 3,20-bis-(ethylene ketal) and 5α,6α-oxido-11α-acyloxyallopregnane-3,20-dione 3,20-bis-(ethylene ketal) wherein the acyl radical is of a hydrocarbon carboxylic acid containing from one to eight carbon atoms, inclusive.

8. 6α-methyl-11β-hydroxyprogesterone.

References Cited in the file of this patent

UNITED STATES PATENTS 2,849,448     Spero et al.     Aug. 26, 1958

OTHER REFERENCES

Madaeva: Chem. Abstr., 34, 7292 (1940).
Ehrenstein: Journal of Organic Chemistry 8, 1943, pp. 83–94.
Fried et al: J.A.C.S., vol. 74, pp. 3962–6 (1952).
Rosenkranz et al.: J. Org. Chem., vol. 17, pp. 290–3 (1952).